United States Patent
Choi et al.

(10) Patent No.: US 10,439,211 B2
(45) Date of Patent: Oct. 8, 2019

(54) CATHODE ACTIVE MATERIAL FOR LITHIUM SECONDARY BATTERY, METHOD OF PREPARING THE SAME, AND LITHIUM SECONDARY BATTERY CONTAINING THE SAME

(71) Applicant: L&F CO., LTD., Daegu (KR)

(72) Inventors: Su An Choi, Daegu (KR); Ho Jun Jeong, Daegu (KR); Sang Hoon Jeon, Daegu (KR); Ji Woon Yang, Daegu (KR); Jun Ho Shin, Daegu (KR); Ji Sun An, Daegu (KR); Bong Jun Jeong, Daegu (KR)

(73) Assignee: L&F CO., LTD., Daegu (KR)

( * ) Notice: Subject to any disclaimer, the term of this patent is extended or adjusted under 35 U.S.C. 154(b) by 0 days.

(21) Appl. No.: 15/171,212

(22) Filed: Jun. 2, 2016

(65) Prior Publication Data

US 2016/0276660 A1    Sep. 22, 2016

Related U.S. Application Data (63) Continuation of application No. PCT/KR2014/011709, filed on Dec. 2, 2014.

(30) Foreign Application Priority Data

Dec. 2, 2013 (KR) .................. 10-2013-0148772

(51) Int. Cl.
| | |
|---|---|
| *H01M 4/36* | (2006.01) |
| *H01M 4/58* | (2010.01) |
| *H01M 4/485* | (2010.01) |
| *H01M 4/505* | (2010.01) |
| *H01M 4/525* | (2010.01) |
| *H01M 4/131* | (2010.01) |
| *H01M 10/0525* | (2010.01) |
| *H01M 10/052* | (2010.01) |
| *H01M 4/02* | (2006.01) |

(52) U.S. Cl.
CPC ........... *H01M 4/366* (2013.01); *H01M 4/131* (2013.01); *H01M 4/485* (2013.01); *H01M 4/505* (2013.01); *H01M 4/525* (2013.01); *H01M 4/5825* (2013.01); *H01M 10/0525* (2013.01); *H01M 10/052* (2013.01); *H01M 2004/028* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2008/0063941 A1 | 3/2008 | Itaya et al. | |
| 2011/0226985 A1* | 9/2011 | Park ................... | C01G 45/1228 252/182.1 |
| 2013/0040193 A1 | 2/2013 | Tsuchida et al. | |
| 2014/0113193 A1* | 4/2014 | Tsunozaki ............. | H01M 4/364 429/220 |
| 2016/0276658 A1* | 9/2016 | Choi ..................... | H01M 4/366 |

FOREIGN PATENT DOCUMENTS

| | | |
|---|---|---|
| JP | 2008071569 A | 3/2008 |
| JP | 2008226463 A | 9/2008 |
| JP | 2011-233246 | 11/2011 |
| KR | 1020060021252 A | 3/2006 |
| KR | 10-2011-0019574 | 2/2011 |
| KR | 10-1169947 | 8/2012 |
| KR | 20120139833 A | 12/2012 |
| KR | 20130022018 A | 3/2013 |
| WO | WO-2012176904 A1 | 12/2012 |
| WO | WO-2014128903 A1 * | 8/2014 ............ H01M 4/131 |

OTHER PUBLICATIONS

Derwent English abstract for WO 2014/128903A1. (Year: 2014).*
Machine-assisted English translation of WO 2014/128903A1. (Year: 2014).*
International Search Report and Written Opinion for PCT/KR2014/011709 dated Mar. 18, 2015, 12 pages (English translation of search report only).

* cited by examiner

Primary Examiner — Sin J Lee
(74) Attorney, Agent, or Firm — Lex IP Meister, PLLC (57) ABSTRACT

There are provided a cathode active material for a lithium secondary battery, a method of preparing the same, and a lithium secondary battery containing the same. The cathode active material for a lithium secondary battery includes: a compound reversibly intercalating and deintercalating lithium; and a coating layer positioned on at least a portion of a surface of the compound, wherein the coating layer is a composite coating layer containing $Li_3PO_4$ and further containing a lithium metal oxide, a metal oxide, and/or a combination thereof, the lithium metal oxide or the metal oxide containing Zr.

9 Claims, 3 Drawing Sheets

CATHODE ACTIVE MATERIAL FOR LITHIUM SECONDARY BATTERY, METHOD OF PREPARING THE SAME, AND LITHIUM SECONDARY BATTERY CONTAINING THE SAME

CROSS REFERENCE TO RELATED APPLICATIONS

This is a continuation of International Application No. PCT/KR2014/011709 filed on Dec. 2, 2014, and claims the priority of Korean Patent Application No. 10-2013-0148772 filed on Dec. 2, 2013, the entire respective disclosures of which are incorporated herein by reference.

TECHNICAL FIELD

The present invention relates to a method of preparing a cathode active material for a lithium secondary battery and a cathode active material for a lithium secondary battery.

BACKGROUND ART

In accordance with the recent trend toward miniaturization and lightness of portable electronic devices, the necessity for high performance and large capacity of a battery used as a power source of these devices has been increased.

A battery may generate power using materials capable of being electrochemically reacted in a cathode and an anode. As a representative example of the battery as described above, there is a lithium secondary battery generating electrical energy by a change in chemical potential when lithium ions are intercalated into/deintercalated from the cathode and the anode.

The lithium secondary battery is manufactured by using materials capable of reversibly intercalating and deintercalating lithium ions as a cathode active material and an anode active material, and filling an organic electrolyte or a polymer electrolyte between the cathode and the anode.

As the cathode active material of the lithium secondary battery, a lithium complex metal compound has been used. As examples of the lithium complex metal compounds, complex metal oxides such as $LiCoO_2$, $LiMn_2O_4$, $LiNiO_2$, $LiMnO_2$, and the like, have been studied.

Among the cathode active materials, Mn based cathode active materials such as $LiMn_2O_4$, $LiMnO_2$, and the like, are attractive materials having advantages in that they are easily synthesized, are relatively cheap, have the most excellent thermal stability at the time of over-charge as compared to other active materials, and cause little environmental contamination, but have a disadvantage in that capacity is small.

Since $LiCoO_2$ has excellent electric conductivity, a high battery voltage of about 3.7V or so, and excellent cycle life characteristics, stability, and discharge capacity, $LiCoO_2$ is a representative cathode active material commercialized and being sold in the market. However, since $LiCoO_2$ is expensive and occupies 30% of a cost of the battery, there is a problem in that price competitiveness is deteriorated.

Further, among the above-mentioned cathode active materials, $LiNiO_2$ has the highest discharge capacity in view of battery characteristics but has a disadvantage in that it is difficult to synthesize $LiNiO_2$. Further, a high oxidation state of nickel may deteriorate cycle life of a battery and electrodes, cause excessive self-discharge, and deteriorate reversibility. In addition, it is not easy to completely secure stability, such that it is difficult to commercialize $LiNiO_2$.

As the related art, a method of coating a phosphorus compound to impart ion conductivity or roles of a protective layer against metal elusion and side reactions in order to improve performance of a cathode active material has been disclosed below.

A cathode active material for a lithium secondary battery, having a surface on which $Li_3PO_4$ is coated for safety and high capacity of a battery has been disclosed in KR1169947. However, in a method of physically dry-coating $Li_3PO_4$, which is a coating material, it is impossible to improve the structure in an utmost surface of the cathode active material and a chemical reaction with remaining Li does not occur.

Further, a cathode active material of which high-rate capability and cycle characteristics are improved by containing an oxide coating layer formed on a core of the cathode active material has been disclosed in KR2009-0077163. However, in a method of pre-preparing a metal phosphate and coating the pre-prepared metal phosphate on an active material, since binding strength of the pre-prepared metal phosphate is high, at the time of coating, a reaction with a cathode material is not sufficiently carried out, such that there is a limitation in improving a surface structure, and only an effect of coating a single oxide phosphate has been disclosed in KR2009-0077163.

In addition, a technology of decreasing interface resistance using a transition metal reduction layer self-formed by reactions between a transition metal and a compound having a polyanion structure on a surface of a cathode active material contacting a reaction suppression part has been disclosed in JP2011-233246. However, this technology is a technology applied to an all-solid-state battery, and in the case of an organic solvent electrolyte system except for the all-solid-state battery, an effect of the technology was not stated, and an effect at a high voltage in accordance with the recent trend toward high voltage was also not stated.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a cathode active material for a lithium secondary battery having high capacity, high efficiency, and excellent rate capability, and a lithium secondary battery including a cathode containing the cathode active material.

Technical Solution

An exemplary embodiment of the present invention provides a cathode active material for a lithium secondary battery including a compound reversibly intercalating and deintercalating lithium; and a coating layer positioned on at least a portion of a surface of the compound, wherein the coating layer is a composite coating layer containing $Li_3PO_4$ and further containing a lithium metal oxide, a metal oxide, and/or a combination thereof, the lithium metal oxide or the metal oxide containing Zr.

The compound reversibly intercalating and deintercalating lithium may be doped with a metal M, wherein the metal M may be at least one element selected from the group consisting of Mg, Ca, Ni, Ti, Al, Si, Sn, Mn, Cr, Fe, and Zr.

In the compound doped with the metal M, the metal M may be Mg, Ca, or Ti.

In the compound reversibly intercalating and deintercalating lithium, a molar ratio of lithium to metal elements except for lithium in the compound may be more than 1. In more detail, the compound reversibly intercalating and deintercalating lithium may have a Li-rich composition (Li/M ratio>1.0).

Lithium of $Li_3PO_4$ and/or the lithium metal oxide contained in the composite coating layer may be derived from Li contained in the compound reversibly intercalating and deintercalating lithium or from a separate Li source material.

Metals in the lithium metal oxide and/or the metal oxide contained in the composite coating layer may be Na, K, Mg, Ca, Sr, Ni, Co, Ti, Al, Si, Sn, Mn, Cr, Fe, V, Zr, or a combination thereof.

The lithium metal oxide contained in the composite coating layer may be $Li_2ZrO_3$, $Li_2SiO_3$, $Li_4SiO_4$, or a combination thereof.

The metal oxide contained in the composite coating layer may be $ZrO_2$, $SiO_2$, or a combination thereof.

The composite coating layer may further contain an Al compound. The Al compound may be Al oxide. The Al compound may be contained in the composite coating layer by additionally adding an Al raw material to a coating raw material in a method of preparing a cathode active material to be described below.

In the cathode active material, as compared to a cathode active material using the compound reversibly intercalating and deintercalating lithium without the composite coating layer, an amount of residual lithium may be decreased by 10 to 40% based on a weight.

The compound reversibly intercalating and deintercalating lithium may be at least one selected from the group consisting of $Li_aA_{1-b}X_bD_2$ (0.90≤a≤1.8, 0≤b≤0.5); $Li_aA_{1-b}X_bO_{2-c}T_c$ (0.90≤a≤1.8, 0≤b≤0.5, 0≤c≤0.05); $LiE_{1-b}X_bO_{2-c}D_c$ (0≤b≤0.5, 0≤c≤0.05); $LiE_{2-b}X_bO_{4-c}T_c$ (0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_{2-e}T_e$ (0.90≤a≤1.8, 0≤b≤0.9, 0≤c≤0.5, 0.001≤d≤0.1, 0≤e≤0.05); $Li_aNi_bCo_cMn_dG_eO_{2-f}T_f$ (0.90≤a≤1.8, 0≤b≤0.9, 0≤c≤0.5, 0≤d≤0.5, 0.001≤e≤0.1, 0≤e≤0.05); $Li_aNiG_bO_{2-c}T_c$ (0.90≤a≤1.8, 0.001≤b≤0.1, 0≤c≤0.05); $Li_aCoG_bO_{2-c}T_c$ (0.90≤a≤1.8, 0.001≤b≤0.1, 0c≤0.05); $Li_aMnG'_bO_{2-c}T_c$ (0.90≤a≤1.8, 0.001≤b≤0.1, 0≤c≤0.05); $Li_aMn_2G_bO_{2-c}T_c$ (0.90≤a≤1.8, 0.001≤b≤0.1, 0≤c≤0.05); $Li_aMnG'_bPO_4$ (0.90≤a≤1.8, 0.001≤b≤0.1); $LiNiVO_4$; and $Li_{(3-f)}J_2(PO_4)_3$ (0≤f≤2).

In Chemical Formulas, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

A content of the composite coating layer may be 0.2 to 2.0 wt % based on a total weight of the cathode active material.

A weight ratio of Zr/P in the composite coating layer may be 0.2 to 1.2.

A content of Zr in the composite coating layer may be 500 to 3000 ppm, and a content of P in the composite coating layer may be 500 to 5000 ppm.

Another embodiment of the present invention provides a method of preparing a cathode active material for a lithium secondary battery including: preparing a compound reversibly intercalating and deintercalating lithium; preparing a lithium source, a phosphorus source, and/or a metal source; uniformly attaching the lithium source, the phosphorous source, and/or the metal source onto a surface of the compound reversibly intercalating and deintercalating lithium by mixing the lithium source, the phosphorous source, and/or the metal source with the compound reversibly intercalating and deintercalating lithium; and obtaining a compound reversibly intercalating and deintercalating lithium, of which a composite coating layer containing $Li_3PO_4$ and further containing a lithium metal oxide, a metal oxide, and/or a combination thereof is formed on a surface by heat-treating the compound reversibly intercalating and deintercalating lithium, onto which the lithium source, the phosphorous source, and/or the metal source are attached, wherein in the preparing of the lithium source, the phosphorus source, and/or the metal source, the metal source includes a Zr source, and the lithium metal oxide or the metal oxide contains Zr.

In the obtaining of the compound reversibly intercalating and deintercalating lithium, of which the composite coating layer containing $Li_3PO_4$ and further containing the lithium metal oxide, the metal oxide, and/or the combination thereof is formed on the surface by heat-treating the compound reversibly intercalating and deintercalating lithium, onto which the lithium source, the phosphorous source, and/or the metal source are attached, a heat-treatment temperature may be 650 to 950° C.

In the preparing of the lithium source, the phosphorus source, and/or the metal source, the lithium source may be lithium carbonate, lithium nitrate, lithium sulfate, lithium acetate, lithium phosphate, lithium chloride, lithium hydroxide, lithium oxide, or a combination thereof.

In the preparing of the lithium source, the phosphorus source, and/or the metal source, the metal source may include a Zr source, wherein the Zr source may be Zr oxide, Zr alkoxide, Zr hydroxide, or a combination thereof.

In the preparing of the lithium source, the phosphorus source, and/or the metal source, the metal source may include a Si source, wherein the Si source may be Si oxide, Si alkoxide, Si hydroxide, or a combination thereof.

In the preparing of the lithium source, the phosphorus source, and/or the metal source, the phosphorus source may be $(NH_4)_2HPO_4$, $NH_4H_2PO_4$, $Li_3PO_4$, $P_2O_5$, or a combination thereof.

Yet another embodiment of the present invention provides a lithium secondary battery including a cathode containing the cathode active material for a lithium secondary battery as described above; an anode containing an anode active material; and an electrolyte.

Advantageous Effects

According to an embodiment of the present invention, the cathode active material having excellent battery characteristics and the lithium secondary battery containing the same may be provided.

MODE FOR INVENTION

Hereinafter, exemplary embodiments of the present invention will be described in detail. However, the embodiments are described for illustrative purpose, but the present invention is not limited thereto. Therefore, the present invention will be defined by the scope of the appended claims to be described below.

An exemplary embodiment of the present invention provides a cathode active material for a lithium secondary battery including a compound capable of reversibly intercalating and deintercalating lithium; and a coating layer positioned on at least a portion of a surface of the compound, wherein the coating layer is a composite coating layer containing $Li_3PO_4$ and further containing a lithium metal oxide, a metal oxide, and/or a combination thereof, the lithium metal oxide or the metal oxide containing Zr.

The compound capable of reversibly intercalating and deintercalating lithium may be doped with a metal M, wherein the metal M may be at least one element selected from the group consisting of Mg, Ca, Ni, Ti, Al, Si, Sn, Mn, Cr, Fe, and Zr.

Compounds in the composite coating layer may be compounds formed by heat-treatment reactions.

Further, lithium of $Li_3PO_4$ and/or the lithium metal oxide contained in the composite coating layer may be derived from Li contained in the compound capable of reversibly intercalating and deintercalating lithium or from a separate Li source material.

The cathode active material including the composite coating layer containing $Li_3PO_4$ and further containing the lithium metal oxide, the metal oxide, and/or the combination thereof may improve battery characteristics of a lithium secondary battery. In more detail, it is possible to provide a cathode active material having high initial capacity, improved efficiency characteristics, and excellent rate capability as compared to an existing cathode active material.

The metal compound containing Li in the composite coating layer may serve to increase diffusivity (driving force for diffusion) of Li ions in the cathode active material to facilitate movement of the lithium ions, thereby contributing to improvement of battery characteristics.

More specifically, the composite coating layer may cause a synergistic effect on surface modification through complex binding between the compounds on the surface of the cathode active material.

Further, the cathode active material according to the exemplary embodiment of the present invention may improve battery characteristics of a lithium secondary battery. As examples of the improved battery characteristics, there are high initial capacity, improved efficiency, excellent rate capability, and the like, at a high voltage. In more detail, battery characteristics may be improved at a C-rate of 2 C or more.

The composite coating layer may further contain an Al compound.

In the case in which the composite coating layer further contains the Al compound, resistance is decreased, such that a swelling phenomenon may be further suppressed. Therefore, battery stability may be improved.

In the compound doped with the metal M, the metal M may be Mg, Ca, or Ti.

In the compound capable of reversibly intercalating and deintercalating lithium, a molar ratio of lithium to metal elements except for lithium in the compound may be more than 1. In more detail, the compound capable of reversibly intercalating and deintercalating lithium may have a Li-rich composition (Li/M ratio>1.0).

In order to improve battery characteristics, the compound capable of reversibly intercalating and deintercalating lithium may be doped with a specific doping element such as the metal M, and in view of implementing these characteristics, it is preferable that the coating layer is positioned on this compound.

In a $LiMO_2$ (M is Ni, Co, or Mn) composition system, a rocksalt structure may be formed on a surface of a cathode material under general preparation conditions.

In a chemical reaction process of forming $Li_3PO_4$ as in the exemplary embodiment of the present invention, a surface rearrangement reaction may occur (Rocksalt→layered), such that structural defects and impurities formed on the surface may be controlled.

Here, in the case of applying a general $LiMO_2$ (M is Ni, Co, or Mn) composition, in a process of forming $Li_3PO_4$, Li may be insufficient, such that battery characteristics may be partially deteriorated.

Further, in the case of performing $Li_3PO_4$ coating on a composition that is not doped with the metal M, structural defects may occur due to a reduction reaction between P and a surface of the cathode material.

As a result, in the case in which the compound is doped with the metal M while having the Li-rich composition (Li/M ratio>1.0), an effect of the coating layer may be significantly increased by suppressing a lack of lithium occurring in the process of forming $Li_3PO_4$ and surface defects by the reduction reaction.

Further, the compound is coated with the metal M, such that improved battery characteristics may be implemented at a high voltage by structure stabilization.

As described above, in the case of surface modification by treating P, the reduction reaction may excessively occur depending on preparation conditions, such that structural defects due to the lack of Li and oxygen on the surface of the cathode material may occur.

In the case in which theses defects exist, a swelling phenomenon that a cell is swelled particularly at a high voltage may occur, thereby causing a stability problem.

Therefore, the compound is doped with the metal M while having the Li-rich composition (Li/M ratio>1.0), thereby making it possible to effectively suppress the lack of lithium occurring in the process of forming $Li_3PO_4$ and surface defects by the reduction reaction. Therefore, battery stability may be significantly improved by controlling the swelling phenomenon.

The lithium metal oxide contained in the composite coating layer may be $Li_2ZrO_3$, $Li_2SiO_3$, $Li_4SiO_4$, or a combination thereof.

The metal oxide contained in the composite coating layer may be $ZrO_2$, $SiO_2$, or a combination thereof.

The composite coating layer contains the lithium metal compound and the metal oxide, such that it is possible to improve ion conductivity, stabilize a surface structure, and suppress side reactions with the electrolyte.

As described above, lithium of $Li_3PO_4$ and/or the lithium metal oxide contained in the composite coating layer may be derived from Li contained in the compound capable of reversibly intercalating and deintercalating lithium or from a separate Li source material, thereby obtaining an effect of decreasing residual lithium on the surface.

In more detail, an amount of residual lithium in the cathode active material may be decreased by 10 to 40% based on a weight, as compared to a cathode active material using the compound capable of reversibly intercalating and deintercalating lithium without the composite coating layer.

As a specific example, an amount of the residual lithium may be decreased by 10 to 40% to thereby become 60 to 90% based on 100 when an amount of residual lithium, which is residual aqueous lithium ($Li_2CO_3$+LiOH), in the cathode active material that does not include the composite coating layer is considered as 100.

A content of the composite coating layer may be 0.2 to 2.0 wt % based on a total weight of the cathode active material. In the case in which the content is less than 0.2 wt %, roles of the coating layer may be deteriorated, and in the case in which the content is more than 2.0 wt %, initial capacity and charge and discharge efficiency may be deteriorated. However, the content is not limited thereto.

The composite coating layer may contain P. In addition, more specifically, a weight ratio of Zr/P in the composite coating layer may be 0.2 to 1.2. However, the present invention is not limited thereto.

A content of Zr in the composite coating layer may be 500 to 3000 ppm, and a content of P in the composite coating layer may be 500 to 5000 ppm.

As a specific example, the compound capable of reversibly intercalating and deintercalating lithium may be at least one selected from the group consisting of $Li_aA_{1-b}X_bD_2$ (0.90≤a≤1.8, 0≤b≤0.5); $Li_aA_{1-b}X_bO_{2-c}T_c$ (0.90≤a≤1.8, 0≤b≤0.5, 0≤c≤0.05); $LiE_{1-b}X_bO_{2-c}D_c$ (0≤b≤0.5, 0≤c≤0.05); $LiE_{2-b}X_bO_{4-c}T_c$ (0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$(0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$(0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_{2-e}T_e$ (0.90≤a≤1.8, 0≤b≤0.9, 0≤c≤0.5, 0.001≤d≤0.1, 0≤e≤0.05); $Li_aNi_bCo_cMn_dG_eO_{2-f}T_f$ (0.90≤a≤1.8, 0≤b≤0.9, 0≤c≤0.5, 0≤d≤0.5, 0.001≤e≤0.1, 0≤e≤0.05); $Li_aNiG_bO_{2-c}T_c$ (0.90≤a≤1.8, 0.001≤b≤0.1, 0≤c≤0.05); $Li_aCoG_bO_{2-c}T_c$ (0.90≤a≤1.8, 0.001≤b≤0.1, 0≤c≤0.05); $Li_aMnG'_bO_{2-c}T_c$ (0.90≤a≤1.8, 0.001≤b≤0.1, 0≤c≤0.05); $Li_aMn_2G_bO_{2-c}T_c$ (0.90≤a≤1.8, 0.001≤b≤0.1, 0≤c≤0.05); $Li_aMnG'_bPO_4$ (0.90≤a≤1.8, 0.001≤b≤0.1); $LiNiVO_4$; and $Li_{(3-f)}J_2(PO_4)_3$ (0≤f≤2).

In Chemical Formulas, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Another embodiment of the present invention provides a method of preparing a cathode active material for a lithium secondary battery including: preparing a compound capable of reversibly intercalating and deintercalating lithium; preparing a lithium source, a phosphorus source, and/or a metal source; uniformly attaching the lithium source, the phosphorous source, and/or the metal source onto a surface of the compound capable of reversibly intercalating and deintercalating lithium by mixing the lithium source, the phosphorous source, and/or the metal source with the compound capable of reversibly intercalating and deintercalating lithium; and obtaining a compound capable of reversibly intercalating and deintercalating lithium, of which a composite coating layer containing $Li_3PO_4$ and further containing a lithium metal oxide, a metal oxide, and/or a combination thereof is formed on a surface by heat-treating the compound capable of reversibly intercalating and deintercalating lithium, onto which the lithium source, the phosphorous source, and/or the metal source are attached, wherein in the preparing of the lithium source, the phosphorus source, and/or the metal source, the metal source includes a Zr source, and the lithium metal oxide or the metal oxide contains Zr.

In the obtaining of the compound capable of reversibly intercalating and deintercalating lithium, of which the composite coating layer containing $Li_3PO_4$ and further containing the lithium metal oxide, the metal oxide, and/or the combination thereof is formed on the surface by heat-treating the compound capable of reversibly intercalating and deintercalating lithium, onto which the lithium source, the phosphorous source, and/or the metal source are attached, a heat-treatment temperature may be 650 to 950° C. In the case in which the heat-treatment temperature is within the above-mentioned range, the coating layer formed on the surface of the cathode active material may stably perform roles.

In the preparing of the lithium source, the phosphorus source, and/or the metal source, the lithium source may be lithium carbonate, lithium nitrate, lithium sulfate, lithium acetate, lithium phosphate, lithium chloride, lithium hydroxide, lithium oxide, or a combination thereof, but is not limited thereto.

In the preparing of the lithium source, the phosphorus source, and/or the metal source, the metal source may include a Zr source, wherein the Zr source may be Zr oxide, Zr alkoxide, Zr hydroxide, or a combination thereof, but is not limited thereto.

In the preparing of the lithium source, the phosphorus source, and/or the metal source, the metal source may include a Si source, wherein the Si source may be Si oxide, Si alkoxide, Si hydroxide, or a combination thereof, but is not limited thereto.

In the preparing of the lithium source, the phosphorus source, and/or the metal source, the phosphorus source may be $(NH_4)_2HPO_4$, $NH_4H_2PO_4$, $Li_3PO_4$, $P_2O_5$, or a combination thereof, but is not limited thereto.

Since other configurations are the same as those in the exemplary embodiment of the present invention described above, a description thereof will be omitted.

Yet another embodiment of the present invention provides a lithium secondary battery including a cathode, an anode, and an electrolyte, wherein the cathode includes a current collector and a cathode active material layer formed on the current collector, the cathode active material layer containing the cathode active material as described above.

Since the cathode active material is the same as that in the exemplary embodiment of the present invention described above, a description thereof will be omitted.

The cathode active material layer may contain a binder and a conductive material.

The binder serves to suitably bind cathode active material particles to each other and suitably bind the cathode active material to the current collector. As a representative example of the binder, polyvinylalcohol, carboxymethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to an electrode, and any material may be used as long as it does not cause chemical changes in a battery to be configured, and is an electron-conductive material. As an example, a conductive material including a carbon based material such as natural graphite, artificial graphite, carbon black, acetylene black, Ketjen black, carbon fiber, or the like; a metal based material such as metal powder or metal fiber of copper, nickel, aluminum, silver, or the like; a conductive polymer such as a polyphenylene derivative, or the like; or a mixture thereof may be used.

The anode includes a current collector, and an anode active material layer formed on the current collector, wherein the anode active material layer contains an anode active material.

An example of the anode active material includes a material capable of reversibly intercalating and deintercalating lithium ions, a lithium metal, a lithium metal alloy, a material capable of doping and dedoping lithium, or a transition metal oxide.

As the material capable of reversibly intercalating and deintercalating lithium ions, any carbon based anode active material may be used as long as it is generally used as a carbon material in a lithium ion secondary battery. As a representative example, crystalline carbon or amorphous carbon may be used, or crystalline carbon and amorphous carbon may be used together with each other. Examples of the crystalline carbon may include non-shaped or sheet-, flake-, spherical-, or fiber-shaped natural graphite or artificial graphite, and examples of the amorphous carbon may include soft carbon (low-temperature fired carbon), hard carbon, mesophase pitch carbide, fired cokes, and the like.

As the lithium metal alloy, an alloy of lithium and a metal selected from the group consisting of Na, K, Rb, Cs, Fr, Be, Mg, Ca, Sr, Si, Sb, Pb, In, Zn, Ba, Ra, Ge, Al, and Sn may be used.

Examples of the material capable of doping and dedoping lithium may include Si, $SiO_x$ ($0<x<2$), a Si—Y alloy (Y is an element selected from the group consisting of alkali metals, alkali earth metals, group 13 elements, group 14 elements, transition metals, rare earth elements, and a combination thereof, but is not Si), Sn, $SnO_2$, Sn—Y (Y is an element selected from the group consisting of alkali metals, alkali earth metals, group 13 elements, group 14 elements, transition metals, rare earth elements, and a combination thereof, but is not Sn), and the like. In addition, at least one thereof may also be mixed with $SiO_2$ and then used. Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide may include vanadium oxide, lithium vanadium oxide, and the like.

The anode active material layer may also contain a binder, and selectively, the anode active material layer may further contain a conductive material.

The binder serves to appropriately bind anode active material particles to each other and appropriately bind the anode active material to the current collector. As a representative example of the binder, polyvinylalcohol, carboxymethylcellulose, hydroxypropylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to an electrode, and any material may be used as long as it does not cause chemical changes in a battery to be configured, and is an electron-conductive material. As an example, a conductive material including a carbon based material such as natural graphite, artificial graphite, carbon black, acetylene black, Ketjen black, carbon fiber, or the like; a metal based material such as metal powder or metal fiber of copper, nickel, aluminum, silver, or the like; a conductive polymer such as a polyphenylene derivative, or the like; or a mixture thereof may be used.

As the current collector, a material selected from the group consisting of copper foil, nickel foil, stainless steel foil, titanium foil, nickel foam, copper foam, a polymer substrate coated with a conductive metal, and a combination thereof may be used.

As a material of the current collector, Al may be used, but the current collector is not limited thereto.

The anode and the cathode may be prepared by mixing active materials, the conductive material, and the binder in a solvent to prepare active material compositions, and applying the compositions on the current collector, respectively. Since a method for manufacturing an electrode as described above is well-known in the art, a detailed description thereof will be omitted in the present specification. As the solvent, N-methylpyrrolidone, or the like, may be used, but the solvent is not limited thereto.

The electrolyte may contain a non-aqueous organic solvent and a lithium salt.

The non-aqueous organic solvent may serve as a medium through which ions participating in electrochemical reactions of a battery may move.

As the non-aqueous organic solvent, a carbonate based solvent, an ester based solvent, an ether based solvent, a ketone based solvent, an alcohol based solvent, or an aprotic solvent may be used. As the carbonate based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, may be used, and as the ester based solvent, methyl acetate, ethyl acetate, n-propyl acetate, dimethylacetate, methylpropionate, ethylpropionate, γ-butyrolactone, decanolide, valerolactone, mevalonolactone, caprolactone, or the like, may be used. As the ether based solvent, dibutyl ether, tetraglyme, diglyme, dimethoxyethane, 2-methyltetrahydrofuran, tetrahydrofuran, or the like, may be used, and as the ketone based solvent, cyclohexanone, or the like, may be used. In addition, as the alcohol based solvent, ethyl alcohol, isopropyl alcohol, or the like, may be used, and as the aprotic solvent, nitriles such as R—CN (R is a linear, branched, or cyclic hydrocarbon group having 2 to 20 carbon atoms and may include a double bond aromatic ring or an ether bond), amides such as dimethyl formamide, or the like, dioxolanes such as 1,3-dioxolane, or the like, sulfolanes, or the like, may be used.

The non-aqueous organic solvents may be used alone or a mixture of at least one thereof may be used. In the case in which the mixture of at least one thereof is used, a mixing ratio may be appropriately adjusted depending on the desired performance of the battery, which may be obvious to those skilled in the art.

Further, in the case of the carbonate based solvent, it is preferable to use a mixture of a cyclic carbonate and a chain carbonate. In this case, when the cyclic carbonate and the chain carbonate are mixed at a volume ratio of 1:1 to 1:9, performance of the electrolyte may be excellent.

The non-aqueous organic solvent according to the exemplary embodiment of the present invention may further include an aromatic hydrocarbon based organic solvent in addition to the carbonate based solvent. In this case, the carbonate based solvent and the aromatic hydrocarbon based organic solvent may be mixed with each other in a volume ratio of 1:1 to 30:1.

As the aromatic hydrocarbon based organic solvent, an aromatic hydrocarbon based compound represented by the following Chemical Formula 1 may be used.

[Chemical Formula 1]

(In Chemical Formula 1, $R_1$ to $R_6$ are each independently hydrogen, halogen, a (C1-C10) alkyl group, a haloalkyl group, or a combination thereof.)

The aromatic hydrocarbon based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain vinylene carbonate or an ethylene carbonate based compound represented by Chemical Formula 2 in order to improve a cycle life of a battery.

[Chemical Formula 2]

(In Chemical Formula 2, $R_7$ and $R_8$ are each independently hydrogen, a halogen group, a cyano (CN) group, a nitro ($NO_2$) group, or a (C1-C5) fluoroalkyl group, at least one of $R_7$ and $R_8$ being the halogen group, the cyano (CN) group, the nitro ($NO_2$) group, or the (C1-C5) fluoroalkyl group.)

A representative example of the ethylene carbonate based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. In the case of adding an additive for improving a cycle life as described above, a usage amount thereof may be appropriately adjusted.

The lithium salt is a material dissolved in an organic solvent to serve as a lithium ion source in a battery to thereby enable a basic operation of a lithium secondary battery and promote movement of lithium ions between a cathode and an anode. Representative examples of the lithium salt as described above may include one or two or more selected from the group consisting of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2, C_yF_{2y+1}SO_2)$ (where, x and y are natural numbers), LiCl, LiI and $LiB(C_2O_4)_2$ (lithium bis(oxalato)borate; LiBOB) as a supporting electrolytic salt. It is preferable that the lithium salt is used in a concentration range of 0.1 to 2.0M. In the case in which the concentration of the lithium salt is within the above-mentioned range, since the electrolyte has suitable conductivity and viscosity, performance of the electrolyte may be excellent, and lithium ions may effectively move.

A separator may be present between the cathode and the anode depending on the kind of lithium secondary battery. As the separator as described above, a separator made of polyethylene, polypropylene, or polyvinylidene fluoride, or a multilayer separator having at least two layers made of these materials may be used. Also, a mixed multilayer separator such as a polyethylene/polypropylene double-layered separator, a polyethylene/polypropylene/polyethylene triple-layered separator, polypropylene/polyethylene/polypropylene triple-layered separator, and the like, may be used.

Lithium secondary batteries may be classified as a lithium ion battery, a lithium ion polymer battery, and a lithium polymer battery depending on the kinds of separator and electrolyte used therein, be classified as a cylindrical battery, a prismatic battery, a coin type battery, a pouch type battery, and the like, depending on a shape thereof, and be classified as a bulk type battery and a thin film type battery depending on a size thereof. Since structures and manufacturing methods of these batteries are well-known in the art, a detailed description thereof will be omitted.

Figure 1:
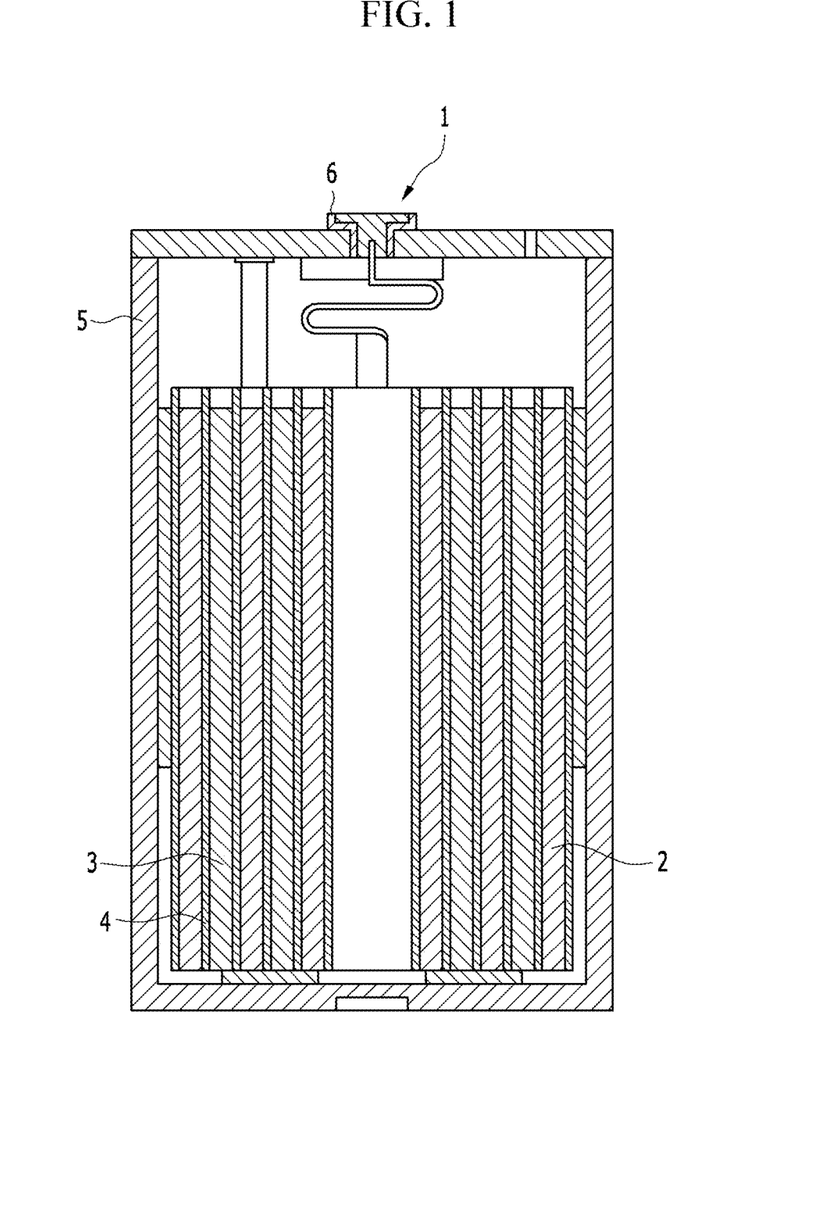
FIG. 1 is a schematic view of a lithium secondary battery.

FIG. 1 schematically illustrates a representative structure of a lithium secondary battery according to the present invention. As illustrated in FIG. 1, the lithium secondary battery 1 includes a cathode 3, an anode 2, a battery container 5 including an electrolyte impregnated into a separator 4 interposed between the cathode 3 and the anode 2, and an encapsulation member 6 encapsulating the battery container 5.

Hereinafter, Examples and Comparative Examples of the present invention will be described. However, the following Examples are provided only as examples of the present invention. Therefore, the present invention is not limited thereto.

EXAMPLE

Preparation Example 1

Based on an active material, $MgCO_3$ (0.01%), $CaOH_2$ (0.005%), and $TiO_2$ (0.005%) were dry-mixed with a mixture in which $Co_3O_4$ and $Li_2CO_3$ were mixed at a stoichiometric ratio and heat-treated at 1000° C. for 10 hours, thereby preparing a cathode active material.

Example 1

After 100 g of $LiCoO_2$, 0.054 g of LiOH powder, 0.172 g of $Zr(OH)_4$ powder, 0.054 g of $SiO_2$ powder, and 0.387 g of $(NH_4)_2HPO_4$ powder were dry-mixed in a mixer to prepare a mixture in which these powders were attached onto a surface of an active material body, the mixture was heat-treated at 800° C. for 6 hours, thereby preparing a cathode active material. Contents of coating elements Zr, Si, and P were 1000 ppm, 250 ppm, and 900 ppm, respectively.

Example 2

A cathode active material was prepared by the same method as in Example 1 except for further adding a P source (1000 ppm).

Example 3

A cathode active material was prepared by the same method as in Example 1 except for further adding a P source (3000 ppm).

Example 4

After 100 g of $LiNi_{0.60}Co_{0.20}Mn_{0.20}O_2$, 0.054 g of LiOH powder, 0.172 g of $Zr(OH)_4$ powder, 0.054 g of $SiO_2$ powder, and 0.387 g of $(NH_4)_2HPO_4$ powder were dry-mixed in a mixer to prepare a mixture in which these powders were attached onto a surface of an active material body, the mixture was heat-treated at 650° C. for 6 hours, thereby preparing a cathode active material.

Contents of coating elements Zr, Si, and P were 1000 ppm, 250 ppm, and 900 ppm, respectively.

Example 5

0.054 g of LiOH powder, 0.172 g of $Zr(OH)_4$ powder, 0.054 g of $SiO_2$ powder, 0.387 g of $(NH_4)_2HPO_4$ powder, and 0.4635 g of Al-isopropoxide were wet-mixed in an ethanol solvent, thereby preparing a coating solution.

$LiCoO_2$ was mixed with the prepared coating solution to coat the coating solution on a cathode active material, followed by drying, thereby preparing a mixture. Thereafter, the mixture was heat-treated at 650° C. for 6 hours, thereby preparing a cathode active material.

Example 6

After 100 g of the cathode active material of Preparation Example 1, 0.054 g of LiOH powder, 0.172 g of $Zr(OH)_4$ powder, 0.054 g of $SiO_2$ powder, and 0.387 g of $(NH_4)_2HPO_4$ powder were dry-mixed in a mixer to prepare a mixture in which these powders were attached onto a surface of an active material body, the mixture was heat-treated at 800° C. for 6 hours, thereby preparing a cathode active material.

Contents of coating elements Zr, Si, and P were 1000 ppm, 250 ppm, and 900 ppm, respectively.

Comparative Example 1

A cathode active material was prepared by the same method as in Example 1 except for dry-mixing 100 g of $LiCoO_2$, 0.054 g of LiOH powder, and 0.172 g of $Zr(OH)_4$ powder in a mixer to prepare a mixture.

Comparative Example 2

A cathode active material was prepared by the same method as in Comparative Example 1 except for dry-mixing 100 g of $LiCoO_2$, 0.054 g of LiOH powder, and 0.054 g of $SiO_2$ powder in a mixer to prepare a mixture.

Comparative Example 3

A cathode active material was prepared by the same method as in Comparative Example 1 except for dry-mixing 100 g of $LiCoO_2$, 0.054 g of LiOH powder, and 0.387 g of $(NH_4)_2HPO_4$ powder in a mixer to prepare a mixture.

Comparative Example 4

A cathode active material was prepared by the same method as in Example 1 except for adding a P source (5000 ppm).

Comparative Example 5

A cathode active material was prepared by heat-treating 100 g of $LiCoO_2$ at 800° C. for 6 hours without coating treatment.

Comparative Example 6

A cathode active material was prepared by heat-treating 100 g of $LiNi_{0.60}Co_{0.20}Mn_{0.20}O_2$ at 600° C. for 6 hours without coating treatment.

Manufacturing of Coin Cell 95 wt % of each of the cathode active materials prepared in Examples and Comparative Examples, 2.5 wt % of carbon black as a conductive material, and 2.5 wt % of polyvinylidene fluoride (PVDF) as a binder were added to 5.0 wt % of N-methyl-2 pyrrolidone (NMP), a solvent, thereby preparing cathode slurry. The prepared cathode slurry was applied onto an aluminum (Al) thin film (thickness: 20 to 40 μm) corresponding to a cathode current collector, vacuum-dried, and roll-pressed, thereby manufacturing a cathode.

As an anode, a Li metal was used.

A coin-cell type half cell was manufactured using the cathode manufactured as described above, the Li metal as a counter electrode, and 1.15M LiPF6 in ethylene carbonate (EC): dimethyl carbonate (DMC) (1:1 vol %) as an electrolyte.

Charge and discharge were performed in a range of 4.5 to 3.0 V.

Manufacturing of Pouch Cell

A cathode was manufactured by the same method as the method used at the time of manufacturing the coin cell, and graphite was used as an anode active material.

A pouch cell (electrode size: 34 mm×50 mm) was manufactured using 1.15M $LiPF_6$ in EC:DMC(1:1 vol %) as an electrolyte.

Swelling was evaluated by measuring a change in thickness depending on a high-temperature storage time after charging the pouch cell up to 4.5V.

Experimental Example 1: Battery Characteristics Evaluation

The following Tables 1 and 2 show initial formation data (4.5V), rate capability data, capacity data at $1^{st}$ cycle, $20^{th}$ cycle, and $30^{th}$ cycle, and cycle life characteristic data in Examples and Comparative Examples.

that in Comparative Example 5, a decrease amount of residual lithium was large, but battery characteristics were deteriorated as compared to Examples.

It was confirmed that in Example 1 in which the cathode active material had the composite coating layer, the amount of residual lithium was small as compared to Comparative Examples 1 to 3 in which the cathode active material had a single coating layer, and at the time of comparing Example 1 with Comparative Example 5 in which only re-firing was performed without coating treatment, in Example 1, the amount of residual lithium was smaller than that of Comparative Example 5. Therefore, it may be appreciated that the residual lithium was decreased by the composite coating layer rather than the re-firing.

The differences in characteristics as described above were confirmed between Example 4 and Comparative Example 6.

Further, in Example 5 in which the Al coating layer was further included, excellent battery characteristics were confirmed.

TABLE 1

| | Discharge Capacity (mAh/g) | Efficiency | Discharge Capacity ($1^{st}$ CY) | Discharge Capacity ($20^{th}$ CY) | Discharge Capacity ($30^{th}$ CY) | Cycle Life Characteristics ($20^{th}$ CY/$1^{st}$ CY, %) | Cycle Life Characteristics ($30^{th}$ CY/$1^{st}$ CY, %) | Rate Capability (1.0/0.2 C, %) | Residual Lithium (%) |
|---|---|---|---|---|---|---|---|---|---|
| Example 1 | 192.75 | 97.77 | 187.10 | 180.03 | 176.21 | 96.22 | 94.18 | 96.66 | 0.082 |
| Example 2 | 194.48 | 97.98 | 188.57 | 182.11 | 177.15 | 96.57 | 93.94 | 96.42 | 0.076 |
| Example 3 | 194.23 | 97.79 | 187.69 | 180.94 | 177.11 | 96.40 | 94.36 | 96.51 | 0.074 |
| Example 4 | 202.47 | 91.13 | 196.42 | 183.97 | 180.11 | 93.66 | 91.70 | 91.14 | 0.159 |
| Example 5 | 193.37 | 97.68 | 188.24 | 183.67 | 182.17 | 97.57 | 96.78 | 96.89 | 0.073 |
| Comparative Example 1 | 190.31 | 95.92 | 184.69 | 175.19 | 171.26 | 94.86 | 92.73 | 93.92 | 0.106 |
| Comparative Example 2 | 190.19 | 95.83 | 184.12 | 174.13 | 170.14 | 94.57 | 92.41 | 93.12 | 0.109 |
| Comparative Example 3 | 191.50 | 95.93 | 184.91 | 174.36 | 171.25 | 94.29 | 92.61 | 93.26 | 0.086 |
| Comparative Example 4 | 190.47 | 96.28 | 182.12 | 170.66 | 168.33 | 93.71 | 92.43 | 93.30 | 0.054 |
| Comparative Example 5 | 189.74 | 95.11 | 185.22 | 160.81 | 147.54 | 86.82 | 79.66 | 92.81 | 0.118 |
| Comparative Example 6 | 204.14 | 88.91 | 196.68 | 179.58 | 168.47 | 91.31 | 85.66 | 88.89 | 0.258 |

As illustrated in Table 1, it was confirmed that in Examples 1 to 3 in which the composite coating layer was included, battery characteristics were more excellent as compared to Comparative Examples 1 to 5.

In more detail, it was confirmed that the cathode active material including the composite coating layer has more excellent characteristics in view of efficiency and initial capacity as compared to the cathode active materials including the coating layers of Comparative Examples 1 to 3.

Further, in Table 1, it was confirmed that in the case in which the P source was added to the composite coating layer, the battery characteristics were improved. However, comparing Examples 2 and 3 with Comparative Example 4, it was confirmed that in Comparative Example 4 in which an excessive amount of the P source was further added, battery characteristics were deteriorated as compared to Examples 2 and 3.

In addition, it was confirmed that amounts of residual aqueous lithium in Examples 1 to 3 were smaller than those in Comparative Examples 1, 2, 3, and 5. It was confirmed

TABLE 2

| | 1.0/1.0 Discharge Capacity (mAh/g) | Efficiency | 3.0/3.0 Discharge Capacity (mAh/g) | Efficiency | 5.0/5.0 Discharge Capacity (mAh/g) | Efficiency |
|---|---|---|---|---|---|---|
| Example 1 | 188.21 | 97.34 | 179.23 | 94.21 | 168.47 | 92.63 |
| Comparative Example1 | 184.34 | 95.05 | 170.55 | 91.17 | 159.10 | 86.10 |
| Comparative Example2 | 183.54 | 94.77 | 168.30 | 90.87 | 153.11 | 83.66 |
| Comparative Example3 | 184.64 | 95.93 | 171.20 | 91.31 | 156.50 | 85.61 |
| Comparative Example4 | 183.12 | 95.12 | 166.20 | 88.77 | 146.55 | 81.28 |

In Table 2, it was confirmed that in Example 1 in which the composite coating layer was included, rate capability was excellent as compared to Comparative Examples 1 to 4 in which the composite coating layer was not included. Particularly, it was confirmed that characteristics were more clearly exhibited at a high C-rate.

Experimental Example 2: Residual Aqueous Lithium Analysis

The residual aqueous lithium in Examples and Comparative Examples was analyzed using a titration method. The results were illustrated in Table 1. It may be appreciated that in Examples according to the present invention, residual lithium was significantly decreased.

Experimental Example 3: Safety Evaluation—Swelling Test

Figure 2:
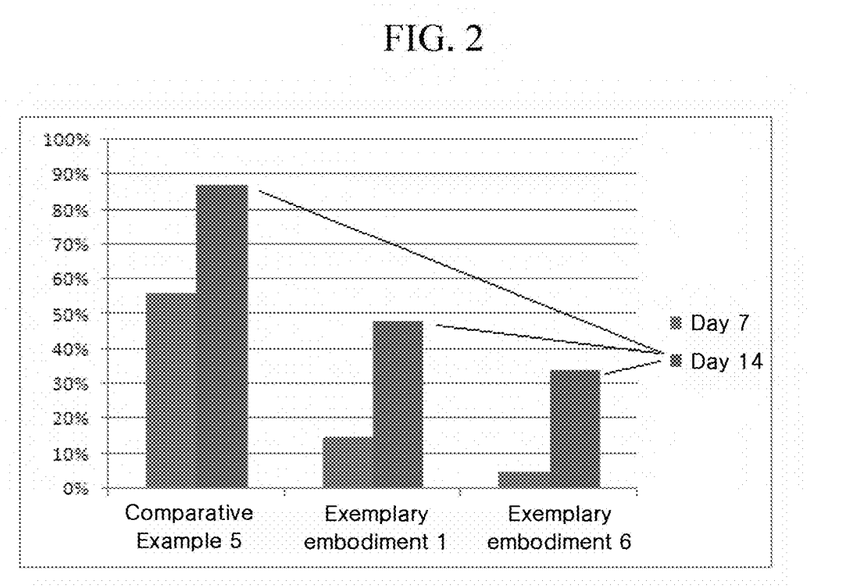
FIG. 2 illustrates a swelling test result of a pouch cell after storing the pouch cell at a high temperature.

The following FIG. 2 illustrates results obtained by measuring changes in thickness on day 7 and day 14 of storage at a high temperature of 60° C. after manufacturing pouch cells using cathode materials of Examples 1 and 6 and Comparative Example 5.

As illustrated in FIG. 2, it was confirmed that in Examples in which the composite coating layer was included, the change in thickness was small as compared to Comparative Example in which a coating layer was not included.

Further, it seems that since in Example 6 in which the doping with a metal M was performed, excessive reduction reactions occurring in a coating treatment process were partially suppressed, a high-temperature storage effect was further improved as compared to Example 1 in which the doping with the metal M was not performed.

Figure 3:
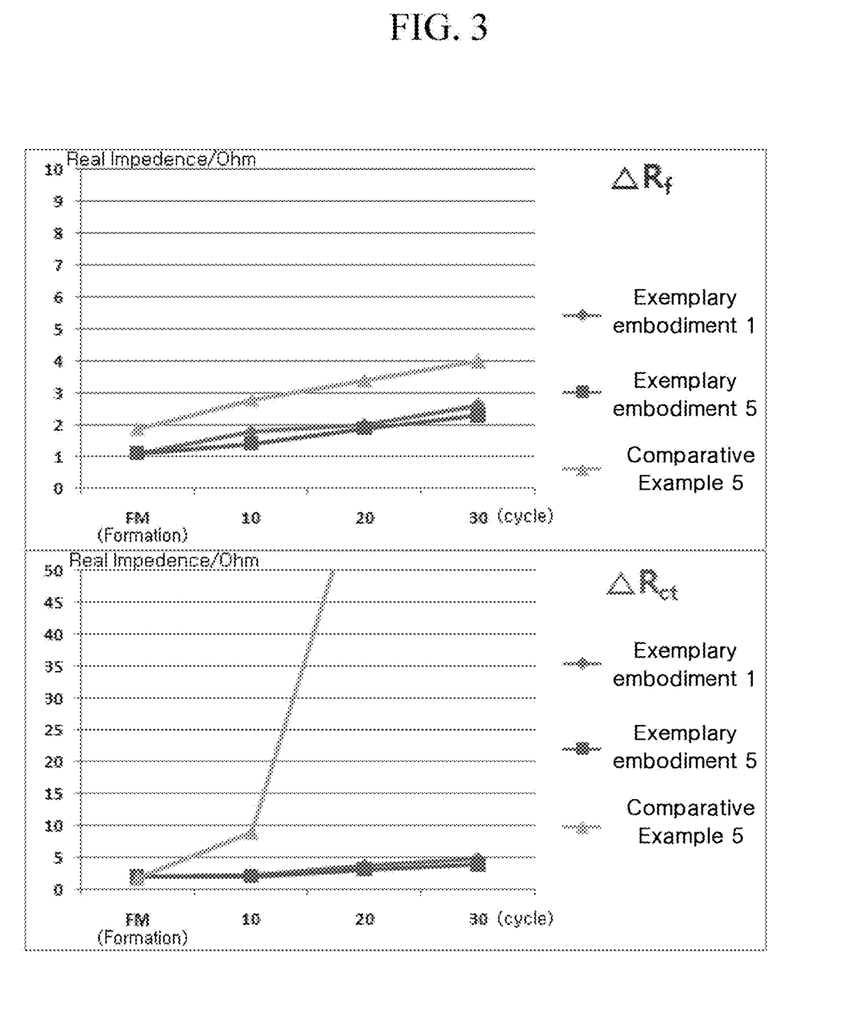
FIG. 3 illustrates an electrochemical impedance spectroscopy (EIS) analysis result.

Experimental Example 4: Electrochemical Impedance Spectroscopy (EIS) Analysis The following FIG. 3 illustrates electrochemical impedance spectroscopy (EIS) analysis results of Examples 1 and 5 and Comparative Example 5. It was confirmed that as cycles were performed, in Examples in which the composite coating layer was included, resistance was low as compared to Comparative Example in which the coating layer was not included.

Further, it was confirmed that in Example 5 in which the Al coating layer was further included, resistance was further decreased as compared to Example 1.

The present invention is not limited to the exemplary embodiments disclosed herein but will be implemented in various forms. Those skilled in the art to which the present invention pertains will appreciate that various modifications and alterations may be made without departing from the spirit or essential feature of the present invention. Therefore, it should be understood that the above-mentioned embodiments are not restrictive but are exemplary in all aspects.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A cathode active material for a lithium secondary battery, the cathode active material comprising:
   a compound reversibly intercalating and deintercalating lithium; and
   a coating layer positioned on at least a portion of a surface of the compound, wherein:
   the compound reversibly intercalating and deintercalating lithium is doped with a metal M, the metal M being at least one element selected from the group consisting of Mg, Ca, Ni, Ti, Al, Si, Sn, Mn, Cr, Fe, and Zr;
   in the compound reversibly intercalating and deintercalating lithium, a molar ratio of lithium to metal elements except for lithium in the compound is more than 1;
   the coating layer is a composite coating layer containing $Li_3PO_4$ and a lithium metal oxide containing Zr;
   the lithium metal oxide is $Li_2ZrO_3$; and
   a content of Zr in the coating layer of the cathode active material is 500 to 3000 ppm, and a content of P in the coating layer of the cathode active material is 500 to 5000 ppm.

2. The cathode active material of claim 1, wherein:
the metal M is Mg, Ca, or Ti.

3. The cathode active material of claim 1, wherein:
lithium of $Li_3PO_4$ and/or the lithium metal oxide contained in the composite coating layer is derived from Li contained in the compound reversibly intercalating and deintercalating lithium or from a separate Li source material.

4. The cathode active material of claim 1, wherein:
the composite coating layer further contains an Al compound.

5. The cathode active material of claim 1, wherein:
in the cathode active material, as compared to a cathode active material using the compound reversibly intercalating and deintercalating lithium without the composite coating layer, an amount of residual lithium is decreased by 10 to 40% based on a weight.

6. The cathode active material of claim 5, wherein:
a weight ratio of Zr/P in the composite coating layer is 0.2 to 1.2.

7. The cathode active material of claim 1, wherein:
the compound reversibly intercalating and deintercalating lithium is at least one selected from the group consisting of $Li_aA_{1-b}X_bD_2$ (0.90≤a≤1.8, 0≤b≤0.5); $Li_aA_{1-b}X_bO_{2-c}T_c$ (0.90≤a≤1.8, 0≤b≤0.5, 0≤c≤0.05); $LiE_{1-b}X_bO_{2-c}D_c$ (0≤b≤0.5, 0≤c≤0.05); $LiE_{2-b}X_bO_{4-c}T_c$ (0≤b≤0.5, 0≤c≤0.05); $Li_aNi_{1-b-c}Co_bX_cD_\alpha$ (0.90≤a≤1.8, 0≤b≤0.5, 0≤c≤0.05, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤a≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_{2-e}T_e$ (0.90≤a≤1.8, 0≤b≤0.9, 0≤c≤0.5, 0.001≤d≤0.1, 0≤e≤0.05); $Li_aNi_bCo_cMn_dG_eO_{2-f}T_f$ (0.90≤a≤1.8, 0≤b≤0.9, 0≤c≤0.5, 0≤d≤0.5, 0.001≤e≤0.1, 0≤e≤0.05); $Li_aNiG_bO_{2-c}T_c$ (0.90≤a≤1.8, 0.001≤b≤0.1, 0≤c≤0.05); $Li_aCoG_bO_{2-c}T_c$ (0.90≤a≤1.8, 0.001≤b≤0.1, 0≤c≤0.05); $Li_aMnG'_bO_{2-c}T_c$ (0.90≤a≤1.8, 0.001≤b≤0.1, 0≤c≤0.05); $Li_aMn_2G_bO_{2-c}T_c$ (0.90≤a≤1.8, 0.001≤b≤0.1, 0≤c≤0.05); $Li_aMnG'_bPO_4$ (0.90≤a≤1.8, 0.001≤b≤0.1); $LiNiVO_4$; and $Li_{(3-f)}J_2(PO_4)_3$ (0≤f≤2):
in Chemical Formulas, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

8. The cathode active material of claim 1, wherein:
a content of the composite coating layer is 0.2 to 2.0 wt % based on a total weight of the cathode active material.

9. A lithium secondary battery comprising:
a cathode containing the cathode active material of claim 1;
an anode containing an anode active material; and
an electrolyte.

* * * * *